United States Patent
Inoue et al.

(10) Patent No.: US 11,717,920 B2
(45) Date of Patent: Aug. 8, 2023

(54) LASER WELDING APPARATUS AND LASER PROCESSING DEVICE

(71) Applicants: Panasonic Intellectual Property Management Co., Ltd., Osaka (JP); HIROSHIMA CO., LTD., Nagoya (JP)

(72) Inventors: Kosuke Inoue, Aichi (JP); Yuji Kaede, Gifu (JP); Shu Kumamoto, Aichi (JP); Hideaki Kunieda, Aichi (JP)

(73) Assignees: Panasonic Intellectual Property Management Co., Ltd., Osaka (JP); HIROSHIMA CO., LTD., Nagoya (JP)

( * ) Notice: Subject to any disclaimer, the term of this patent is extended or adjusted under 35 U.S.C. 154(b) by 67 days.

(21) Appl. No.: 17/379,234

(22) Filed: Jul. 19, 2021

(65) Prior Publication Data
US 2022/0080537 A1 Mar. 17, 2022

(30) Foreign Application Priority Data
Sep. 16, 2020 (JP) ................................. 2020-155523

(51) Int. Cl.
*B23K 37/04* (2006.01)
*B23K 26/03* (2006.01)
(Continued)

(52) U.S. Cl.
CPC .......... *B23K 37/0435* (2013.01); *B23K 26/03* (2013.01); *B23K 26/0626* (2013.01);
(Continued)

(58) Field of Classification Search
CPC ..... B29C 65/1435; B29C 66/81; B29C 66/95; B23K 26/0626; B23K 26/03; B23K 37/0435
See application file for complete search history.

(56) References Cited

U.S. PATENT DOCUMENTS

| 6,444,946 B1 | 9/2002 | Korte |
| 2007/0084552 A1 | 4/2007 | Watanabe et al. |

(Continued)

FOREIGN PATENT DOCUMENTS

| CN | 1951674 A | 4/2007 |
| CN | 107405836 A | 11/2017 |

(Continued)

OTHER PUBLICATIONS

Translation of WO-2020052225-A1 (Year: 2020).*
(Continued)

*Primary Examiner* — George R Koch
(74) *Attorney, Agent, or Firm* — IP Spring

(57) ABSTRACT

A first resin member including a first contact surface and formed of laser beam-transmissive resin and a second resin member including a second contact surface, which contacts the first contact surface, and formed of laser beam-absorbing resin are arranged one upon the other. A laser welding apparatus includes a clamping unit abutting the second resin member and applying clamping force to the second resin member, a laser emitter emitting laser beam, a laser controller controlling output of the laser beam, a displacement sensor measuring displacement of the second contact surface in stacking direction of the resin members, and a control unit controlling the clamping unit to adjust the clamping force corresponding to displacement amount of the second contact surface continuously or intermittently obtained from the displacement sensor.

11 Claims, 4 Drawing Sheets

(51) Int. Cl.
*B23K 26/06* (2014.01)
*B29C 65/14* (2006.01)
*B29C 65/00* (2006.01)

(52) U.S. Cl.
CPC .......... *B29C 65/1435* (2013.01); *B29C 66/81* (2013.01); *B29C 66/95* (2013.01)

(56) References Cited

U.S. PATENT DOCUMENTS

| | | |
|---|---|---|
| 2008/0302484 A1 | 12/2008 | Watanabe et al. |
| 2009/0126869 A1* | 5/2009 | Asada .................. B29C 66/112 |
| | | 156/380.9 |
| 2018/0111327 A1 | 4/2018 | Watanabe et al. |
| 2020/0376605 A1* | 12/2020 | Seo ........................ B23K 11/36 |

FOREIGN PATENT DOCUMENTS

| | | | |
|---|---|---|---|
| JP | 2006-044122 A | 2/2006 | |
| JP | 2007-111927 A | 5/2007 | |
| JP | 2008-254404 A | 10/2008 | |
| WO | WO-2020052225 A1 * | 3/2020 | ............. B29C 65/16 |
| WO | WO-2020052226 A1 * | 3/2020 | ............. B29C 65/16 |

OTHER PUBLICATIONS

Translation of WO-2020052226-A1 (Year: 2020).*
EPO, Extended European Search Report for European Patent Application No. 21186606.6, dated Dec. 23, 2021, 8 pages.

* cited by examiner

LASER WELDING APPARATUS AND LASER PROCESSING DEVICE

CROSS-REFERENCE TO RELATED APPLICATION

The present application claims priority under 35 U.S.C. § 119(a) to Japanese Patent Application No. 2020-155523, filed on Sep. 16, 2020, which is incorporated herein by reference in its entirety.

1. FIELD

The following description relates to a laser welding apparatus and a laser processing device.

2. DESCRIPTION OF RELATED ART

A typical laser welding apparatus joins two resin members arranged one upon the other by laser welding. There are various types of laser welding apparatuses that perform laser welding while applying pressure with a jig, such as a clamp, to press the surfaces of the two resin members against each other so that the resin members can be welded sufficiently.

Japanese Laid-Open Patent Publication No. 2006-44122 describes an example of a laser welding apparatus that clamps two resin members by a clamp claw and detects the reactive force acting on the clamp claw. Then, the clamping force applied by the clamp claw is adjusted in accordance with the detected reactive force so that the two resin members are appropriately pressed against each other. Subsequently, the laser welding apparatus performs laser welding in a state in which the adjusted clamping force is applied to the two resin members by the clamp claw.

Japanese Laid-Open Patent Publication No. 2007-111927 discloses a technique that presses two resin members against each other with a clamp mechanism and detects changes in the temperature of the contact surfaces where the resin members contact each other when irradiating the contact surfaces with a laser beam to adjust the clamping force of the clamp mechanism.

Japanese Laid-Open Patent Publication No. 2008-254404 describes a laser welding apparatus that gradually increases the clamping force of a jig applied to press two resin members against each other and detects a reactive force acting on the jig to obtain a change in the gradient of the detected reactive force relative to displacement of the jig. When the angle of the gradient changes in a direction in which the reactive force increases greatly, the laser welding apparatus stops gradually increasing the clamping force applied to the two resin members by the jig. Subsequently, the laser welding apparatus laser-welds the two resin members in a state in which the clamping force applied to the two resin members by the jig is the clamping force that was obtained when stopping the gradual increase.

SUMMARY

One of two resin members that are laser-welded is formed of a laser beam-transmissive resin that transmits laser beams. The other one of the two resin members is formed of a laser beam-absorbing resin that absorbs laser beams. The laser beam-absorbing resin member is thermally expanded when absorbing a laser beam during laser welding. Further, laser welding has various effects on the two resin members, which are arranged one upon the other, in the vicinity of the contact surfaces, such as hardening. Thus, it is preferred that an appropriate clamping force be applied to the two resin members in accordance with the state of the two resin members during laser welding. Also, it is preferred that the laser beam be appropriately emitted in accordance with the state of the two resin members during laser welding.

The application of excessive clamping force to the two resin members during laser welding may result in, for example, the formation of excessive burrs or the formation of cracks in the welded resin members caused by residual stress. The application of clamping force that is too small to the two resin members during laser welding may result in insufficient pressing of the resin members against each other. When the resin members are pressed against each other insufficiently, fine gaps will form between the contact surfaces of the two resin members, which are arranged one upon the other. When laser welding is performed in this state, the fine gaps will hinder the transfer of heat from the laser beam-absorbing resin member to the laser beam-transmissive resin member. As a result, the laser beam-absorbing resin member, which continues absorbing the laser beam without sufficiently transferring heat, will be carbonized. Further, the laser beam-transmissive resin member may not be melted adequately due to the insufficient transfer of heat from the laser beam-absorbing resin member.

The laser welding apparatus described in Japanese Laid-Open Patent Publication Nos. 2006-44122 and 2008-254404 applies clamping force to two resin members to press the two resin members against each other prior to performing laser welding. However, in Japanese Laid-Open Patent Publication Nos. 2006-44122 and 2008-254404, the clamping force applied to the two resin members is not adjusted during laser welding. Thus, depending on the adjustment of the clamping force applied to the two resin members prior to laser welding, the formation of excessive burrs or the formation of cracks may occur in the welded resin members.

As described in Japanese Laid-Open Patent Publication No. 2007-111927, when the temperature at the contact surfaces of the two resin members is detected and the clamping force applied to the two resin members is adjusted in accordance with the detected temperature during laser welding, adjustment of the clamping force will be difficult if the detected temperature change is subtle. Moreover, when the clamping force is controlled in accordance with the temperature change at the contact surfaces of the two resin members in real-time, the control for adjusting the clamping force may be delayed with respect to the speed of the temperature change. Thus, the clamping force applied to the two resin members may not appropriately be in accordance with the state of the resin members during laser welding.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a laser welding apparatus joins a first resin member, which is formed of a laser beam-transmissive resin and includes a first contact surface, and a second resin member, which is formed of a laser beam-absorbing resin and includes a second contact surface, by melting the first contact surface and the second contact surface with a laser beam in a state in which the first resin member and the second resin member are arranged one upon another with the first contact surface contacting the second contact surface. The laser welding apparatus includes a clamping unit, a laser emitter, a laser controller, a displacement sensor, and a control unit. The clamping unit abuts at least one of the first resin member or the second resin member, which are arranged one upon the other, to apply clamping force to the at least one of the first resin member or the second resin member. The laser emitter emits a laser beam transmitted through the first resin member. The laser controller controls a laser output of the laser beam emitted from the laser emitter. The displacement sensor measures displacement of at least one of the first contact surface or the second contact surface in a direction in which the first resin member and the second resin member are arranged one upon the other. The control unit continuously or intermittently obtains a displacement amount of the at least one of the first contact surface or the second contact surface from the displacement sensor and controls the clamping unit to increase or decrease the clamping force in accordance with the obtained displacement amount of the at least one of the first contact surface or the second contact surface.

With this configuration, the clamping force applied to the first resin member and the second resin member is increased or decreased in accordance with the displacement amount of the at least one of the first contact surface or the second contact surface displaced in the stacking direction in which the first resin member and the second resin member are arranged one upon the other. The first contact surface and the second contact surface are displaced in the stacking direction in correspondence with the state of the first resin member and the state of the second resin member during laser welding. In other words, the displacement of the first contact surface and the second contact surface in the stacking direction is changed in correspondence with the state of the first resin member and the second resin member during laser welding. The clamping force applied to the first resin member and the second resin member is increased or decreased in accordance with the displacement amount of the at least one of the first contact surface or the second contact surface. Thus, an appropriate clamping force can be applied to the first resin member and the second resin member in accordance with the state of the first resin member and the second resin member during laser welding. As a result, the formation of burrs and cracks is limited in the first resin member and the second resin member. This also limits carbonizing or inadequate melting of the resin members that would be caused by insufficient pressing of the resin members against each other.

In the laser welding apparatus, it is it preferred that when the control unit detects a change in the displacement of the at least one of the first contact surface or the second contact surface resulting from thermal expansion of the second resin member based on the displacement amount of the at least one of the first contact surface or the second contact surface obtained from the displacement sensor, the control unit controls the clamping unit to increase the clamping force over a predetermined period. Further, it is preferred that when the control unit subsequently detects reversal of a direction of the displacement of the at least one of the first contact surface or the second contact surface based on the displacement amount of the at least one of the first contact surface or the second contact surface obtained from the displacement sensor, the control unit controls the clamping unit to decrease the clamping force in a stepped manner.

With this configuration, the clamping force applied to the first resin member and the second resin member is increased over the predetermined period from when a change in the displacement of the contact surface resulting from the thermal expansion of the second resin member is detected. This restricts separation of the first resin member from the second contact surface caused by the thermal expansion of the second resin member. In this manner, the first contact surface and the second contact surface remain sufficiently pressed against each other even while the second resin member is thermally expanded.

Further, when reversal of the displacement direction of the contact surface is detected, the clamping force applied to the first resin member and the second resin member is decreased in a stepped manner. The displacement direction of the contact surface measured by the displacement sensor is reversed when the second resin member starts softening. Accordingly, the clamping force applied to the first resin member and the second resin member is decreased in a stepped manner as the second resin member starts to soften. This decreases the amount of softened resin pushed out from the periphery of the first contact surface and the second contact surface.

In the laser welding apparatus, it is preferred that when the displacement direction measured by the displacement sensor is reversed, the laser controller controls the laser emitter to increase the laser output in a stepped manner over a preset period.

With this configuration, the laser output of the laser beam emitted to the second contact surface can be increased in a stepped manner from when the second resin member starts softening. This allows the laser beam to be emitted in accordance with the state of the second resin member.

In the laser welding apparatus, it is preferred that when the preset period elapses, the laser controller control the laser emitter to gradually decrease the laser output.

With this configuration, the laser output is gradually decreased to gradually cool the first contact surface and the second contact surface that are in a state melted and joined with each other. Also, the first contact surface and the second contact surface are gradually cooled when the clamping force applied to the first resin member and the second resin member is being decreased in a stepped manner. This reduces the residual stress that occurs in the first resin member and the second resin member subsequent to cooling. As a result, the formation of cracks is further limited in the first resin member and the second resin member.

In the laser welding apparatus, it is preferred that the displacement sensor be a contact type displacement sensor.

With this configuration, the contact type displacement sensor directly detects displacement of the contact surface so that the displacement can be detected more accurately than, for example, an optical displacement sensor. In addition, the contact type displacement sensor can detect a displacement of the contact surface at a relatively lower cost than an optical displacement sensor that has the same measurement accuracy.

It is preferred that the laser welding apparatus further include a reactive force measuring sensor. The reactive force measuring sensor measures a reactive force added to the clamping unit by the at least one of the first resin member or the second resin member, which the clamping unit is abut against. Further, it is preferred that the control unit obtain the reactive force measured by the reactive force measuring sensor and control the clamping unit to increase or decrease the clamping force in accordance with the displacement amount of the at least one of the first contact surface or second contact surface obtained from the displacement sensor and the reactive force obtained from the reactive force measuring sensor.

With this configuration, the clamping force applied to the first resin member and the second resin member is increased or decreased in accordance with the reactive force added to the clamping unit by the at least one of the first resin member or the second resin member in addition to the displacement amount of the contact surface. The reactive force added to the clamping unit by the at least one of the first resin member or the second resin member, which is in contact with the clamping unit, changes in accordance with the state of the first resin member and the second resin member during laser welding. Therefore, clamping force can be applied in a further suitable manner to the first resin member and the second resin member during laser welding in accordance with the state of the first resin member and the second resin member by further increasing or decreasing the clamping force applied to the first resin member and the second resin member in accordance with the reactive force. As a result, the formation of burrs and cracks is further limited in the first resin member and the second resin member.

In one general aspect, a laser processing device is used to laser-weld and join a first resin member, which is formed of a laser beam-transmissive resin and includes a first contact surface, and a second resin member, which is formed of a laser beam-absorbing resin and includes a second contact surface, by melting the first contact surface and the second contact surface with a laser beam in a state in which the first resin member and the second resin member are arranged one upon another with the first contact surface contacting the second contact surface. The laser processing device includes a laser emitter, a laser controller, and an input unit. The laser emitter emits a laser beam transmitted through the first resin member. The laser controller controls a laser output of the laser beam emitted from the laser emitter. The input unit receives a measurement signal corresponding to a displacement amount of at least one of the first contact surface or the second contact surface measured by a displacement sensor that measures displacement of the at least one of the first contact surface or the second contact surface in a direction in which the first resin member and the second resin member are arranged one upon the other. The laser controller controls the laser emitter to change the laser output in a stepped manner based on the measurement signal provided to the input unit.

With this configuration, the laser output of the laser beam emitted to the second contact surface can be changed in accordance with the displacement amount of the at least one of the first contact surface or the second contact surface displaced in the stacking direction in which the first resin member and the second resin member are arranged one upon the other. The first contact surface and the second contact surface are displaced in the stacking direction in correspondence with the state of the first resin member and the state of the second resin member during laser welding. In other words, the displacement of the first contact surface and the second contact surface in the stacking direction is changed in correspondence with the state of the first resin member and the second resin member during laser welding. The laser output of the laser beam emitted to the second contact surface is changed in a stepped manner in accordance with the displacement amount of the at least one of the first contact surface or the second contact surface. Thus, the first resin member and the second resin member are irradiated with the laser beam that is suitable for the state of the first resin member and the second resin member during the laser welding. This limits the formation of excessive burrs and the occurrence of cracking in the first resin member and the second resin member.

In the laser processing device, it is preferred that after the laser controller detects a change in the displacement of the at least one of the first contact surface or the second contact surface resulting from thermal expansion of the second resin member from the measurement signal provided to the input unit, when the laser controller detects reversal of a direction of the displacement of the at least one of the first contact surface or the second surface from the measurement signal, the laser controller controls the laser emitter to increase the laser output in a stepped manner over a preset period.

With this configuration, the laser output of the laser beam emitted to the second contact surface can be increased in a stepped manner from when the second resin member starts softening. This allows the laser beam to be emitted in accordance with the state of the second resin member. As a result, the first resin member and the second resin member are joined with improved quality.

In the laser processing device, it is preferred that the input unit be further provided with a clamp control signal corresponding to a clamping force applied by a clamping unit to at least one of the first resin member or the second resin member, which are arranged one upon the other, the clamping unit being abut against the one of the first resin member and the second resin member. Further, it is preferred that the laser controller control the laser emitter to increase the laser output in a stepped manner over a preset period from either one of when a change in the displacement of the at least one of the first contact surface or the second contact surface resulting from thermal expansion of the second resin member is detected based on the measurement signal provided to the input unit and when an increase in the clamping force is detected based on the clamp control signal provided to the input unit.

With this configuration, the laser output is increased in a stepped manner from when a change in the displacement of the contact surface resulting from the thermal expansion of the second resin member is detected so that the laser output of the laser beam emitted to the second contact surface can be increased in a stepped manner from when the second contact surface starts thermal expansion. Further, in a case where the clamping force is increased in accordance with the changes in the displacement of the contact surface resulting from the thermal expansion of the second resin member, the laser output is increased in a stepped manner from when an increase in the clamping force is detected based on the clamp control signal so that the laser output of the laser beam emitted to the second contact surface can be increased in a stepped manner from when the second resin member starts thermal expansion. This allows for the laser beam to be emitted in a manner suitable for the state of the second resin member. As a result, the first resin member and the second resin member are joined with improved quality.

In the laser processing device, it is preferred that when the preset period elapses, the laser controller control the laser emitter to gradually decrease the laser output.

With this configuration, the laser output is gradually decreased to gradually cool the first contact surface and the second contact surface that are in a state melted and joined with each other. This reduces the residual stress that occurs in the first resin member and the second resin member subsequent to cooling. As a result, the formation of cracks is further limited in the first resin member and the second resin member.

In the laser processing device, it is preferred that the input unit be further provided with a clamp control signal corresponding to a clamping force applied by a clamping unit to at least one of the first resin member or the second resin member, which are arranged one upon the other, the clamping unit being abut against the one of the first resin member and the second resin member. Further, it is preferred that the laser controller control the laser emitter to gradually decrease the laser output when detecting that the clamping force is being decreased in a stepped manner from the clamp control signal provided to the input unit and that a change amount of the displacement of the at least one of the first contact surface or the second contact surface is constant over a predetermined period based on the measurement signal provided to the input unit.

With this configuration, the laser output is gradually decreased to gradually cool the first contact surface and the second contact surface that are in a state melted and joined with each other. Also, the first contact surface and the second contact surface are gradually cooled when the clamping force applied to the first resin member and the second resin member is decreased in a stepped manner. This reduces the residual stress that occurs in the first resin member and the second resin member subsequent to cooling. As a result, the formation of cracks is further limited in the first resin member and the second resin member.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
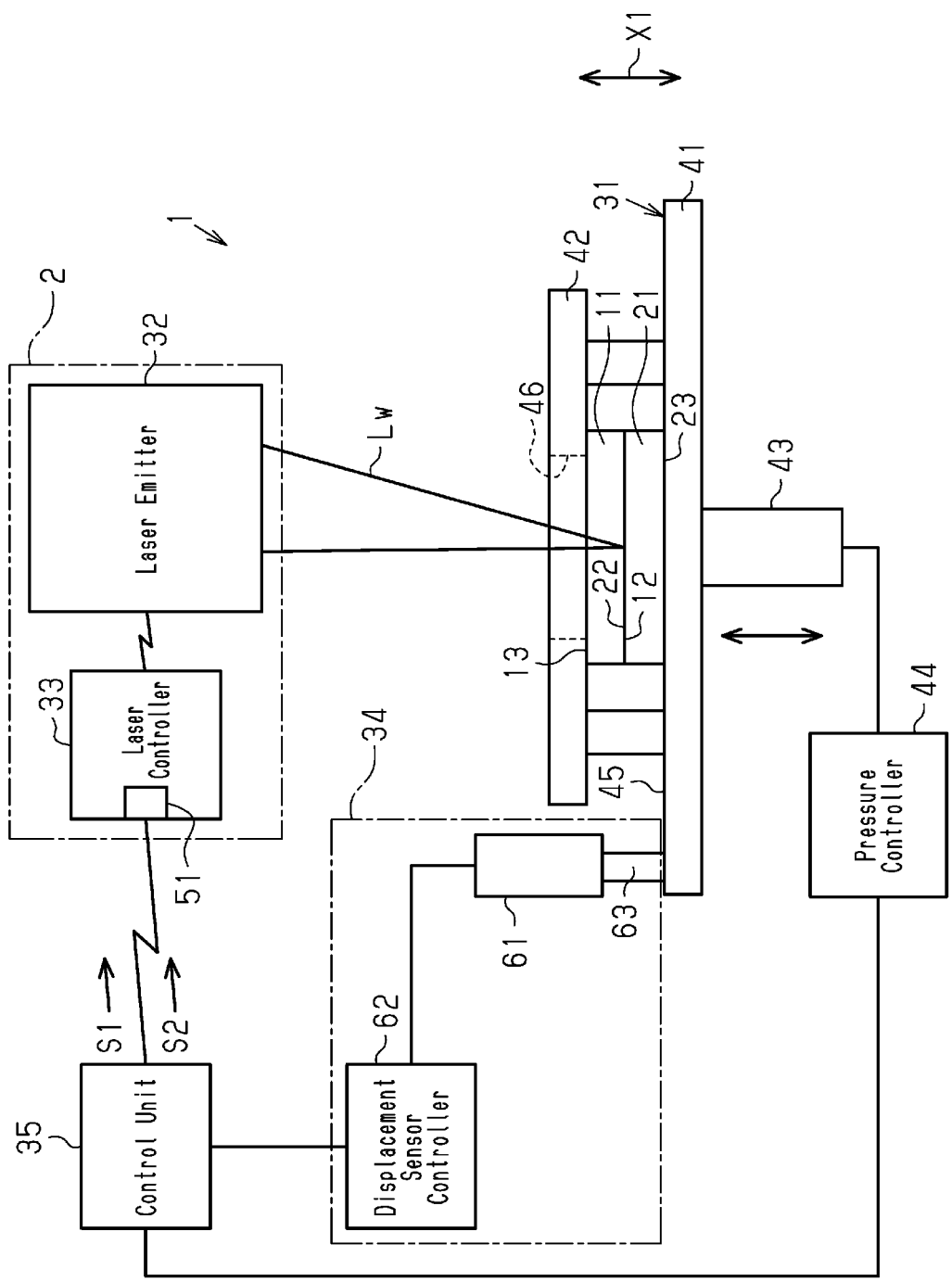
FIG. 1 is a schematic diagram of a laser welding apparatus in accordance with an embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a laser welding apparatus will now be described with reference to the drawings.

The drawings may not be to scale, and the relative size, proportions, and depiction of elements in the drawings may be exaggerated for clarity, illustration, and convenience.

A laser welding apparatus 1 in the present embodiment shown in FIG. 1 is for laser welding a first resin member 11 and a second resin member 21 in a state in which the first resin member 11 and the second resin member 21 are arranged one upon the other. The laser welding apparatus 1 includes a clamping unit 31, a laser emitter 32, a laser controller 33, a displacement sensor 34, and a control unit 35. The laser welding apparatus 1 in the present embodiment includes a laser processing device 2. The laser processing device 2 includes the laser emitter 32 and the laser controller 33. The laser emitter 32 and the laser controller 33 do not have to be included in the laser welding apparatus 1 as part of the laser processing device 2.

The clamping unit 31 contacts and applies clamping force to at least one of the first resin member 11 or the second resin member 21, which are arranged one upon the other. The clamping unit 31 includes, for example, a movable stage 41 and a top panel 42 arranged opposing the movable stage 41. Further, the clamping unit 31 includes a pressure adjustment unit 43 and a pressure controller 44. The pressure adjustment unit 43 applies pressure to the movable stage 41. The pressure controller 44 controls the pressure adjustment unit 43.

The movable stage 41 includes a setting surface on which the first resin member 11 and the second resin member 21 are set. The setting surface 45 is flat.

The first resin member 11 is formed of a laser beam-transmissive resin that transmits laser beams and includes a first contact surface 12. Further, the first resin member 11 includes a first abutment surface 13 at the side opposite to the first contact surface 12. The second resin member 21 is formed of a laser beam-absorbing resin that absorbs laser beams and includes a second contact surface 22. Further, the second resin member 21 includes a second abutment surface 23 at the side opposite to the second contact surface 22. The first resin member 11 and the second resin member 21 are arranged one upon the other on the setting surface 45 in a state in which the first contact surface 12 is in contact with the second contact surface 22. Also, the first resin member 11 and the second resin member 21 are arranged one upon the other on the setting surface 45 in a state in which the second abutment surface 23 abuts the setting surface 45.

In the present embodiment, a stacking direction X1 in which the first resin member 11 and the second resin member 21 are arranged one upon the other is orthogonal to the second contact surface 22. In a state in which the first resin member 11 and the second resin member 21 are set on the setting surface 45, the stacking direction X1 is orthogonal to the setting surface 45.

The top panel 42 and the movable stage 41 sandwich the first resin member 11 and the second resin member 21. The top panel 42 is arranged opposing the setting surface 45. The top panel 42 may be formed of a material that does not transmit laser beams or a transparent body, such as glass, that transmits laser beams. When the top panel 42 is formed of a material that does not transmit laser beams, the top panel 42 includes a through hole for passage of a laser beam. The through hole may be a physical space through which a laser beam passes. Alternatively, a member that allows for transmission of a laser beam, such as an optical glass, may be arranged in the through hole. In other words, the through hole may be an optical window. In this manner, when the top panel 42 is formed of a material that does not transmit laser beams, the top panel 42 includes a portion that allows for optical transmission of a laser beam regardless of whether there is a physical space.

In the present embodiment, the top panel 42 is formed of a metal material. Further, the top panel 42 includes a through hole 46 from which the first resin member 11 is exposed. In the present embodiment, the through hole 46 includes a physical space through which a laser beam passes. The top panel 42 can be arranged to contact the first abutment surface 13 of the first resin member 11 set on the setting surface 45.

The pressure adjustment unit 43 is a mechanism that applies pressure to the movable stage 41 in a direction orthogonal to the setting surface 45 in order to apply clamping force to the second resin member 21 and press the first contact surface 12 and the second contact surface 22 against each other. The pressure adjustment unit 43 applies pressure to the movable stage 41 toward the top panel 42 using, for example, one or more of a motor, air pressure, hydraulic pressure, or spring pressure. In the present embodiment, the pressure adjustment unit 43 uses, for example, a servomotor.

The pressure controller 44 controls the pressure adjustment unit 43 to adjust the clamping force applied to the movable stage 41 by the pressure adjustment unit 43. Further, the pressure controller 44 controls the pressure adjustment unit 43 to adjust a moving speed of the movable stage 41.

The laser emitter 32 emits a laser beam Lw that is transmitted through the first resin member 11. The laser controller 33 controls a laser output of the laser beam Lw emitted from the laser emitter 32.

The laser controller 33 includes a laser oscillator (not shown) that emits the laser beam Lw. The laser oscillator is a laser light source, such as a YAG laser, a $CO_2$ laser, or a fiber laser. The laser beam Lw emitted from the laser oscillator is supplied through an optical fiber and the like to the laser emitter 32. The laser controller 33 may include an input unit 51 that receives at least one of a measurement signal S1 or a clamp control signal S2, which are electric signals that will be described later. The laser oscillator may be included in the laser emitter 32 instead of the laser controller 33.

The laser emitter 32 emits the laser beam Lw supplied from the laser controller 33 toward the first resin member 11 and the second resin member 21, which are set on the setting surface 45. The laser beam Lw emitted from the laser emitter 32 and transmitted through the first resin member 11 irradiates the second contact surface 22 of the second resin member 21. In the present embodiment, the laser beam Lw emitted from the laser emitter 32 passes through the through hole 46 and is transmitted through the first resin member 11.

The laser controller 33 controls the laser oscillator to control when to emit the laser beam Lw. Further, the laser controller 33 controls the laser emitter 32 to control scanning of the second resin member 21 with the laser beam Lw. Specifically, the laser controller 33 controls the laser emitter 32 to control, for example, a scanning passage and a scanning speed of the laser beam Lw. Also, the laser controller 33 controls the laser emitter 32 to adjust a focal spot diameter of the laser beam Lw on the second contact surface 22.

The displacement sensor 34 measures a displacement of at least one of the first contact surface 12 or the second contact surface 22 in the stacking direction X1. The displacement sensor 34 in the present embodiment measures, for example, the displacement of the second contact surface 22 in the stacking direction X1. Specifically, the displacement sensor 34 in the present embodiment measures the displacement of the setting surface 45 in a direction orthogonal to the setting surface 45 to measure the displacement of the second contact surface 22 of the second resin member 21 on the setting surface 45.

The displacement sensor 34 can be of a contact type displacement sensor or a non-contact type displacement sensor such as of a laser focus type, an ultrasonic type, an optical type, and an eddy-current type. A known displacement sensor can be used as the displacement sensor 34. The displacement sensor 34 in the present embodiment is, for example, a contact type displacement sensor. The displacement sensor 34 includes, for example, a measurement head 61 and a displacement sensor controller 62.

The measurement head 61 includes a contact element 63. In the present embodiment, the measurement head 61 is arranged so that the contact element 63 contacts the setting surface 45. The contact element 63 is moved in a direction orthogonal to the setting surface 45 as the setting surface 45 moves in a direction orthogonal to the setting surface 45. In this manner, the measurement head 61 measures the displacement of the setting surface 45 in a direction orthogonal to the setting surface 45.

The displacement sensor controller 62 calculates a displacement amount of the contact element 63. Specifically, the displacement sensor controller 62 calculates a displacement amount of the contact element 63 to obtain the displacement amount of the setting surface 45 in a direction orthogonal to the setting surface 45. In the present embodiment, the displacement sensor controller 62 outputs the calculated displacement amount of the contact element 63, or the displacement amount of the second contact surface 22 in the stacking direction X1.

The control unit 35 is, for example, a programmable logic controller (PLC) or a personal computer. The control unit 35 may include a memory, a timer, and the like.

The control unit 35 obtains the displacement amount of the second contact surface 22 from the displacement sensor 34 continuously or intermittently and controls the clamping unit 31 in accordance with the obtained displacement amount of the second contact surface 22 to increase or decrease the clamping force applied to the first resin member 11 and the second resin member 21. The control unit 35 calculates the clamping force applied to the second resin member 21 based on the obtained displacement amount of the second contact surface 22. The control unit 35 outputs the calculated clamping force to the clamping unit 31. In an example, the control unit 35 outputs data that indicates the calculated clamping force to the clamping unit 31. Further, the control unit 35 may control the clamping unit 31 to control the moving speed of the movable stage 41.

The control unit 35 outputs the measurement signal S1 that corresponds to the displacement amount obtained from the displacement sensor 34 to the input unit 51. In the present embodiment, the measurement signal S1 is an electric signal corresponding to the displacement amount of the second contact surface 22 measured by the displacement sensor 34. The measurement signal S1 is provided to the input unit 51 continuously or intermittently.

The control unit 35 may output the clamp control signal S2 that corresponds to the clamping force applied to at least one of the first resin member 11 or the second resin member 21 by the clamping unit 31 to the input unit 51. In the present embodiment, the clamp control signal S2 is an electric signal corresponding to the clamping force applied to the second resin member 21 by the clamping unit 31. The clamp control signal S2 may be provided to the input unit 51 continuously or intermittently. Alternatively, the clamp control signal S2 may be provided to the input unit 51 when the clamping force applied to the second resin member 21 by the clamping unit 31 is changed.

Operation of Laser Welding Apparatus

The operation of the laser welding apparatus 1 will now be described.

Figure 2:
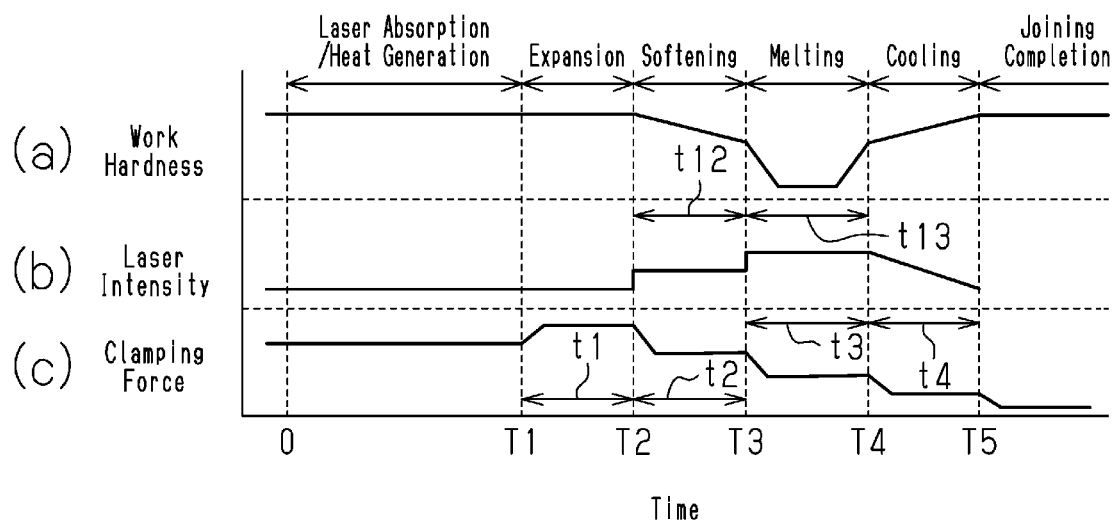
FIG. 2 is a diagram illustrating the relationship of time and hardness of resin members, laser intensity, and clamping force applied to the resin members during laser welding.

FIG. 2 shows the relationship of time and the hardness of a work when the laser welding apparatus 1 performs laser welding in an upper row (a). In the present embodiment, the hardness of a work corresponds to the hardness of the welded portions of the first resin member 11 and the second resin member 21. FIG. 2 shows the relationship of time and the intensity of the laser beam Lw emitted from the laser emitter 32 when the laser welding apparatus 1 performs laser welding in a middle row (b). FIG. 2 shows the relationship of time and the clamping force applied by the clamping unit 31 when the laser welding apparatus 1 performs laser welding in a bottom row (c). FIG. 2 shows the stages of changes in the state of the first resin member 11 and the second resin member 21, namely, laser absorption/heat generation, expansion, softening, melting, cooling, and welding completion. The time for each stage is exemplary and may differ from the actual time.

Figure 3:
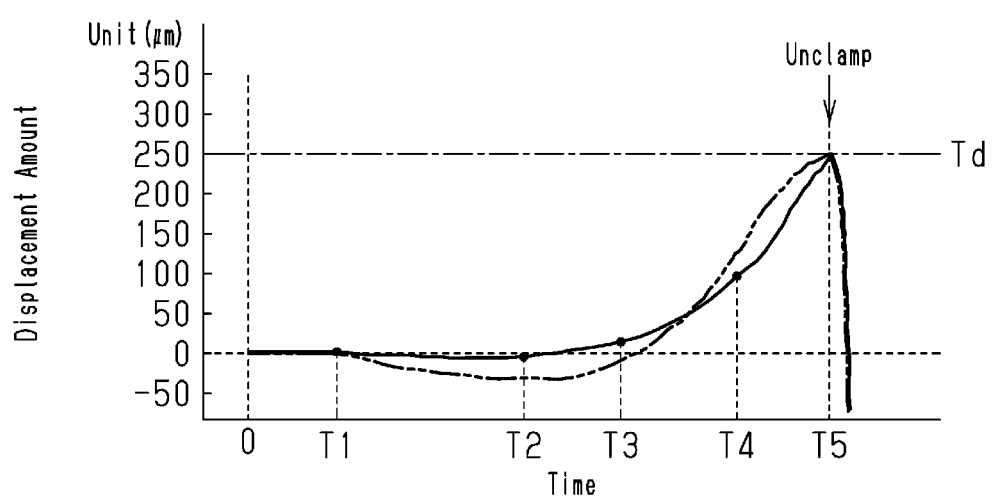
FIG. 3 is a graph showing the relationship of time and displacement amount of contact surfaces of the resin members during laser welding.

FIG. 3 is a graph showing the relationship of time and the displacement amount measured by the displacement sensor 34 during laser welding. The solid line in FIG. 3 shows the relationship of time and the displacement amount measured by the displacement sensor 34 when the clamping force applied to the second resin member 21 for laser welding is increased or decreased in accordance with the displacement amount measured by the displacement sensor 34. Further, the double-dashed line shows the relationship of time and the displacement amount measured by a displacement sensor when a constant clamping force is applied to the resin member for laser welding.

As shown in FIG. 1, the first resin member 11 and the second resin member 21 are first set on the setting surface 45 of the movable stage 41 in a state in which the first resin member 11 and the second resin member 21 are arranged one upon the other and the first contact surface 12 is in contact with the second contact surface 22. In this case, the first resin member 11 and the second resin member 21 are arranged on the setting surface 45 so that the second abutment surface 23 of the second resin member 21 is in contact with the setting surface 45. In a state in which the first resin member 11 and the second resin member 21 are arranged on the setting surface 45, the stacking direction X1 substantially coincides with a direction orthogonal to the setting surface 45.

The first resin member 11 and the second resin member 21 are sandwiched by the movable stage 41 and the top panel 42, which is in contact with the first abutment surface 13 of the first resin member 11. In a state in which the top panel 42 is in contact with the first resin member 11, the top panel 42 will not be displaced in a direction orthogonal to the setting surface 45, or the stacking direction X1.

The control unit 35 controls the clamping unit 31 to apply a clamping force to the second resin member 21. In this manner, a clamping force is applied to the second resin member 21 from the clamping unit 31 to press the first resin member 11 and the second resin member 21 against each other in the stacking direction X1. The displacement sensor 34 measures the displacement of the setting surface 45 in a direction orthogonal to the setting surface 45. The control unit 35 obtains the displacement amount of the second contact surface 22 from the displacement sensor 34 continuously or intermittently. Further, the control unit 35 continuously or intermittently provides the input unit 51 with the measurement signal S1 corresponding to the displacement amount of the second contact surface 22 obtained from the displacement sensor 34. Also, the control unit 35 may provide the input unit 51 with the clamp control signal S2. In the present embodiment, the control unit 35 provides the input unit 51 with the clamp control signal S2.

A target displacement amount Td is preset for the displacement amount measured by the displacement sensor 34 so that the first resin member 11 and the second resin member 21 will have the desired thickness in the stacking direction X1 subsequent to the laser welding. In other words, the laser welding is performed on the first resin member 11 and the second resin member 21 so that the displacement amount measured by the displacement sensor 34 becomes the target displacement amount Td when completing the joining of the first resin member 11 and the second resin member 21. For example, in the present embodiment, the target displacement amount Td is set to 250 μm.

After completing the pressure application for pressing the first resin member 11 and the second resin member 21 against each other in the stacking direction X1, the laser controller 33 controls the laser emitter 32 to start emission of the laser beam Lw. In the present embodiment, the displacement sensor 34 uses the position of the second contact surface 22 in the stacking direction X1 when emission of the laser beam Lw is started as a reference position and measures the displacement amount of the second contact surface 22 from the reference position. That is, in the present embodiment, the displacement sensor 34 uses a reference position of the position of the setting surface 45 in the stacking direction X1 when emission of the laser beam Lw is started and measures the displacement amount of the setting surface 45 from the reference position. Thus, in the present embodiment, the displacement amount measured by the displacement sensor 34 is zero when the second contact surface 22 is at the reference position, or when the setting surface 45 is at the reference position. The laser beam Lw emitted from the laser emitter 32 and transmitted through the first resin member 11 irradiates the second contact surface 22 of the second resin member 21. The second resin member 21 absorbs the laser beam Lw and starts generating heat.

As shown in FIGS. 1 to 3, at the stage in which the second resin member 21 absorbs the laser beam Lw and generates heat, the hardness of the first resin member 11 and the hardness of the second resin member 21 remain constant and do not change. Thus, there is no change in the displacement amount measured by the displacement sensor 34. Also, at this stage, the intensity of the laser beam Lw is set to be constant. Furthermore, at this stage, the clamping force applied by the clamping unit 31 remains constant.

As time T1 elapses from when emission of the laser beam Lw was started, the second resin member 21 starts thermal expansion. At the stage in which the second resin member 21 thermally expands, the hardness of the first resin member 11 and the hardness of the second resin member 21 remain the same and do not change from the stage in which the second resin member 21 absorbed the laser beam Lw and generated heat. Also, at the stage in which the second resin member 21 thermally expands, the intensity of the laser beam Lw is set to be constant and equal to that at the stage in which the second resin member 21 absorbed the laser beam Lw and generated heat.

When the second resin member 21 is thermally expanded without the hardness of the first resin member 11 and the hardness of the second resin member 21 being changed, the movable stage 41 is pushed back by the volume change of the second resin member 21 in a direction opposite to the force-applying direction of the clamping unit 31. This changes the displacement of the setting surface 45 measured by the displacement sensor 34. In regards to the direction in which the setting surface 45 is displaced, displacement in the direction that is the same as the direction in which the clamping force is applied by the clamping unit 31 will be referred to as displacement in the positive direction, and displacement in the direction opposite to the direction in which the clamping force is applied will be referred to as displacement in the negative direction. Specifically, displacement in the positive direction is displacement in a direction that decreases the thickness of the first resin member 11 and the thickness of second resin member 21 in the stacking direction X1, and displacement in the negative direction is displacement in a direction that increases the thickness of the first resin member 11 and the second resin member 21 in the stacking direction X1.

When the setting surface 45 is displaced toward the negative side by thermal expansion of the second resin member 21, the displacement sensor 34 measures the direction and amount of the displacement. The control unit 35 detects changes in the displacement of the second contact surface 22 resulting from the thermal expansion of the second resin member 21 based on the displacement amount obtained from the displacement sensor 34. Specifically, the control unit 35 detects changes in the displacement of the second contact surface 22 resulting from the thermal expansion of the second resin member 21 when displacement of the setting surface 45 in the negative direction is detected based on the displacement amount obtained from the displacement sensor 34. The control unit 35 determines that the setting surface 45 is displaced in the negative direction, for example, when detecting that the gradient of the displacement amount relative to time is directed in the negative direction. Alternatively, the control unit 35 may determine that the setting surface 45 is displaced in the negative direction when detecting that the displacement amount of the setting surface 45 is changed from zero toward the negative side, instead of when detecting a change in the gradient of the displacement amount relative to time.

In this case, the laser controller 33 detects the changes in the displacement of the second contact surface 22 resulting from thermal expansion of the second resin member 21 from the measurement signal S1 provided to the input unit 51 from the control unit 35. The laser controller 33 detects the changes in the displacement of the second contact surface 22 resulting from thermal expansion of the second resin member 21 from the measurement signal S1 in the same manner as the control unit 35.

Subsequently, when detecting the changes in the displacement of the second contact surface 22 resulting from thermal expansion of the second resin member 21, the control unit 35 controls the clamping unit 31 to increase the clamping force over a predetermined period. In the present embodiment, the clamping force applied to the second resin member 21 is increased by one step over period t1 from when the changes in the displacement of the second resin member 21 resulting from thermal expansion of the second contact surface 22 is detected. This minimizes separation of the second resin member 21 from the setting surface 45 when the second resin member 21 thermally expands. This also minimizes separation of the first resin member 11 from the second contact surface 22 when the second resin member 21 thermally expands. In this manner, the first contact surface 12 and the second contact surface 22 are pressed against each other in a satisfactory manner even when the second resin member 21 thermally expands.

Period t1 may be freely set taking into consideration the physical properties of the first resin member 11 and the second resin member 21, the intensity of the laser beam Lw, the clamping force applied by the clamping unit 31, and the like. For example, in the present embodiment, period t1 corresponds to the period from when the control unit 35 detects the changes in the displacement of the second contact surface 22 resulting from thermal expansion of the second resin member 21 to when the control unit 35 detects reversal of the displacement direction of the second contact surface 22. In other words, in the present embodiment, period t1 corresponds to the period from when the second resin member 21 starts expanding to when the second resin member 21 starts softening.

The second resin member 21 starts softening when time T2 elapses from when emission of the laser beam Lw was started. When the second resin member 21 starts softening, a portion of the second resin member 21 near the second contact surface 22 gradually softens as time elapses. The softened portion of the second resin member 21 near the second contact surface 22 is compressed by the clamping force applied by the clamping unit 31. This displaces the second contact surface 22 toward the setting surface 45. Thus, the setting surface 45 is displaced in the same direction as the force-applying direction of the clamping unit 31. Accordingly, the displacement amount of the setting surface 45 measured by the displacement sensor 34 is shifted in the positive direction.

When the setting surface 45 is displaced in the positive direction by the softening of the second resin member 21, the displacement sensor 34 measures the direction and amount of the displacement. The control unit 35 detects that the displacement direction of the second contact surface 22 is reversed based on the displacement amount obtained from the displacement sensor 34. Specifically, the control unit 35 detects that the displacement direction of the second contact surface 22 is reversed when detecting that the displacement direction of the setting surface 45 is reversed from the negative direction to the positive direction based on the displacement amount obtained from the displacement sensor 34. The control unit 35 determines that the displacement direction of the setting surface 45 is reversed from the negative direction to the positive direction, for example, when detecting that the gradient of the displacement amount relative to time is shifted from the negative direction to the positive direction. There is no limitation to how the control unit 35 determines reversal of the displacement direction of the setting surface 45 from the negative direction to the positive direction. The control unit 35 may determine that the displacement direction of the setting surface 45 is reversed from the negative direction to the positive direction, for example, when detecting that the gradient of the displacement amount relative to time is shifted from the negative direction to zero. Alternatively, the control unit 35 may determine that the displacement direction of the setting surface 45 is reversed when detecting that the setting surface 45 that was being displaced in the negative direction starts being displaced in the positive direction, instead of detecting a change in the gradient of the displacement amount relative to time. In other words, the control unit 35 may determine that the displacement direction of the setting surface 45 is reversed from the negative direction to the positive direction when detecting that the displacement amount of the setting surface 45 stopped increasing in the negative direction and started increasing in the positive direction.

Subsequently, when detecting reversal of the displacement direction of the second contact surface 22, the control unit 35 controls the clamping unit 31 to decrease the clamping force in a stepped manner. In the present embodiment, the clamping force applied to the second contact surface 22 is decreased by one step over period t2 from when the reversal of the displacement direction of the second contact surface 22 is detected. This decreases the amount of softened resin pushed out from the periphery of the first contact surface 12 and the second contact surface 22.

Period t2 may be freely set taking into consideration the physical properties of the first resin member 11 and the second resin member 21, the intensity of the laser beam Lw, the clamping force applied by the clamping unit 31, and the like. For example, in the present embodiment, period t2 is set to the period from when the control unit 35 detects the reversal of the displacement direction of the second contact surface 22, that is, when the second resin member 21 starts softening, to approximately when the second resin member 21 starts melting.

Then, when period t2 elapses, the control unit 35 controls the clamping unit 31 to further decrease the clamping force applied to the second contact surface 22 by one step over period t3. When period t3 elapses, the control unit 35 controls the clamping unit 31 to further decrease the clamping force applied to the second contact surface 22 by one step over period t4. In this manner, after detecting the reversal of the displacement direction of the second contact surface 22, the control unit 35 controls the clamping unit 31 to decrease the clamping force in a stepped manner until the first resin member 11 and the second resin member 21 are released (unclamped) from the top panel 42 and the movable stage 41.

Period t3 and period t4 may be freely set taking into consideration the physical properties of the first resin member 11 and the second resin member 21, the intensity of the laser beam Lw, the clamping force applied by the clamping unit 31, and the like. For example, in the present embodiment, period t3 is set to the period from approximately when the second resin member 21 starts melting to approximately when the first resin member 11 and the second resin member 21 start cooling. Further, in the present embodiment, period t4 is set to, for example, the period from approximately when the first resin member 11 and the second resin member 21 start cooling to approximately when the cooling of the first resin member 11 and the second resin member 21 ends.

When the displacement direction measured by the displacement sensor 34 is reversed, the laser controller 33 controls the laser emitter 32 to increase the laser output in a stepped manner over a preset period. For example, after a change in the displacement of the second contact surface 22 resulting from thermal expansion of the second resin member 21 is detected based on the measurement signal S1 and when reversal of the displacement direction of the second contact surface 22 is detected based on the measurement signal S1, the laser controller 33 controls the laser emitter 32 to increase the laser output in a stepped manner over a preset period. In the present embodiment, as described above, the laser controller 33 detects that the displacement direction of the second contact surface 22 is reversed from the measurement signal S1 at time T2. When detecting the reversal of the displacement direction of the second contact surface 22 from the measurement signal S1 at time T2, the laser controller 33 first increases the laser output by one step. In the present embodiment, the laser controller 33 controls the laser emitter 32 to increase the laser output by one step over period t12 from when the reversal of displacement direction of the second contact surface 22 is detected. Then, the laser controller 33 controls the laser emitter 32 to further increase the laser output by one step over period t13 from when period t12 elapses.

The laser output is increased or decreased by increasing or decreasing the energy intensity per unit area at the portion irradiated by the laser beam Lw. The laser output is, for example, increased or decreased by adjusting at least one of the intensity of the laser beam Lw (i.e., laser power), the number of times the laser beam Lw is emitted (i.e., on-off of laser beam Lw), or the scanning speed of the laser beam Lw.

Period t12 and period t13 may be freely set taking into consideration the physical properties of the first resin member 11 and the second resin member 21, the intensity of the laser beam Lw, the clamping force applied by the clamping unit 31, and the like. For example, in the present embodiment, period t12 is set as the period from when the laser controller 33 detects the reversal of displacement direction of the second contact surface 22, that is, when the second resin member 21 starts softening, to approximately when the second resin member 21 starts melting. Further, in the present embodiment, period t13 is set as, for example, the period from approximately when the second resin member 21 starts melting to approximately when the first resin member 11 and the second resin member 21 start cooling. In the present embodiment, period t12 and period t13, or the period from time T2 to time T4, corresponds to a set period.

As time T3 elapses from when emission of the laser beam Lw was started, the second resin member 21 starts melting. Also, the heat transferred from the second resin member 21 to the first resin member 11 starts melting the first resin member 11. A portion of the first resin member 11 near the first contact surface 12 and a portion of the second resin member 21 near the second contact surface 22 further soften as time elapses. This joins the first contact surface 12 and the second contact surface 22. Further, the portion of the first resin member 11 near the first contact surface 12 and the portion of the second resin member 21 near the second contact surface 22 are compressed by the clamping force applied by the clamping unit 31. This further displaces the second contact surface 22 toward the setting surface 45, which, in turn, further displaces the setting surface 45 in the same direction as the force-applying direction of the clamping unit 31. In this manner, the displacement amount of the setting surface 45 measured by the displacement sensor 34 is further shifted in the positive direction.

As described above, when detecting the reversal of the displacement direction of the second contact surface 22, the control unit 35 controls the clamping unit 31 to decrease the clamping force in a stepped manner. Thus, when the portion of the first resin member 11 near the first contact surface 12 and the portion of the second resin member 21 near the second contact surface 22 are in a molten state, the clamping force applied to the second resin member 21 is decreased in a stepped manner. The molten resin is softer than resin that is in a softened state. Therefore, when the portion of the first resin member 11 near the first contact surface 12 and the portion of the second resin member 21 near the second contact surface 22 are molten, it is preferred that the clamping force applied to the second resin member 21 be further decreased from that when the portion of the second resin member 21 near the second contact surface 22 is softened. In the present embodiment, when the portion of the first resin member 11 near the first contact surface 12 and the portion of the second resin member 21 near the second contact surface 22 are molten, the clamping force applied to the second resin member 21 is further decreased by one step from the step when the portion of the second resin member 21 near the second contact surface 22 is softened. This decreases the amount of molten resin pushed out from the periphery of the first contact surface 12 and the second contact surface 22. Thus, the formation of burrs is limited.

The laser controller 33 controls the laser emitter 32 to decrease the laser output or stop emission of the laser beam Lw when period t13 elapses (that is, when above-described preset period elapses). Accordingly, the first resin member 11 and the second resin member 21 start cooling. In the present embodiment, when period t13 elapses, time T4 has elapsed from when emission of the laser beam Lw was started. In the present embodiment, the laser controller 33 controls the laser emitter 32 to gradually decrease the laser output when period t13 elapses. Then, the laser controller 33 controls the laser emitter 32 to stop emission of the laser beam Lw when the laser output becomes equal to a preset output. In the present embodiment, when the emission of the laser beam Lw is stopped, time T5 has elapsed from when emission of the laser beam Lw was started. When the emission of the laser beam Lw is stopped, the joining of the first resin member 11 and the second resin member 21 is completed.

When the emission of the laser beam Lw is stopped, the control unit 35 controls the clamping unit 31 to release the first resin member 11 and the second resin member 21 from the top panel 42 and the movable stage 41. Consequently, the first resin member 11 and the second resin member 21 of which the first contact surface 12 and second contact surface 22 are joined, are removed from the setting surface 45.

Figure 4:
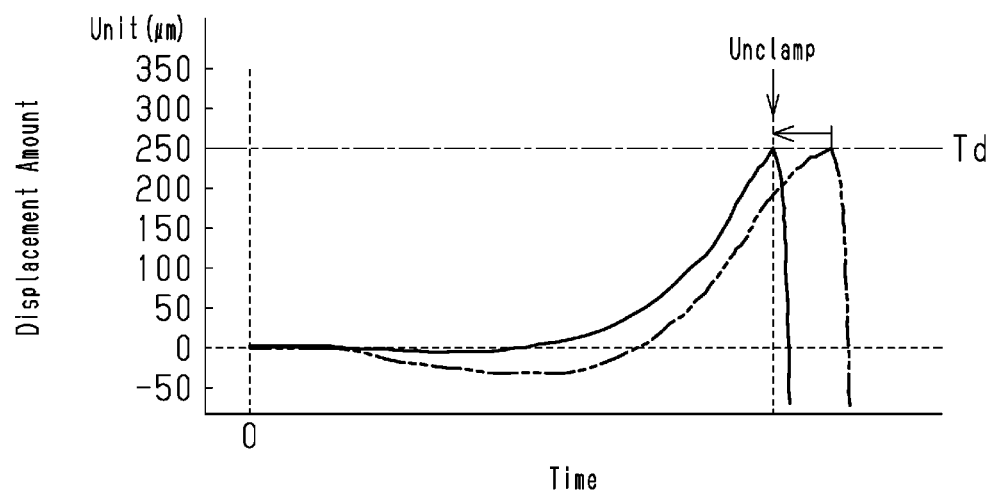
FIG. 4 is a graph showing the relationship of time and displacement amount of the contact surfaces of the resin members during laser welding.
Figure 5:
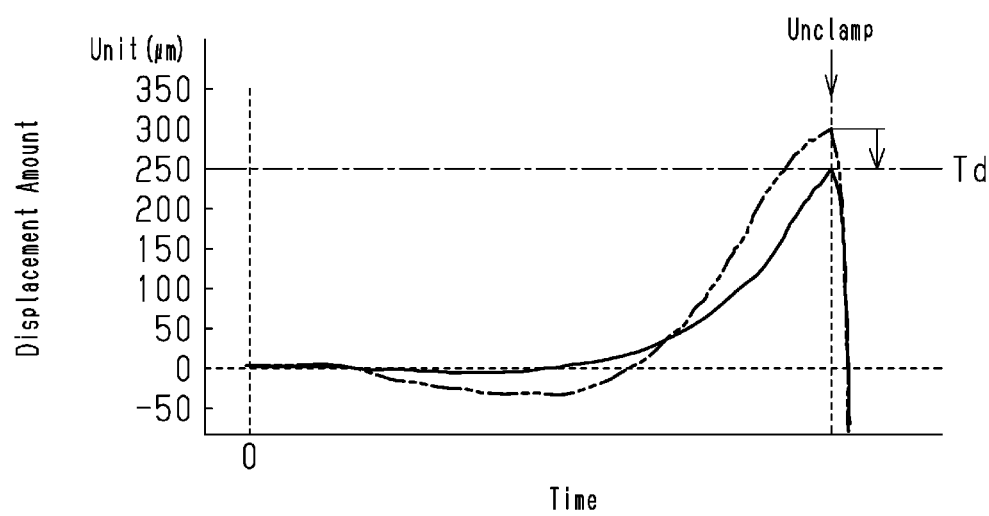
FIG. 5 is a graph showing the relationship of time and displacement amount of the contact surfaces of the resin members during laser welding.

Laser welding of the resin members performed by the laser welding apparatus 1 will now be compared with conventional laser welding of the resin members performed under a constant clamping force. In FIGS. 3 to 5, the solid lines show the relationship of time and the displacement amount of the contact surfaces of the resin members when the laser welding is performed by the laser welding apparatus 1. Further, in FIGS. 3 to 5, the double-dashed lines show the relationship of time and the displacement amount of the contact surfaces of the resin members when the laser welding of the resin members is performed under a constant clamping force. The displacement amount of the contact surfaces of the resin members corresponds to the displacement amount of the contact surface of one of the two resin members in a direction in which the laser-welded resin members are arranged one upon the other.

As shown in FIG. 3, for example, when the target displacement amount Td is reached during the same processing period, the quality of the joined resin members is better when undergoing laser welding performed by the laser welding apparatus 1 than when undergoing conventional laser welding under a constant clamping force. This is because the laser welding performed by the laser welding apparatus 1 does not apply excessive force to the first resin member 11 and the second resin member 21 from when the second resin member 21 starts softening until when the joining of the first resin member 11 and the second resin member 21 is completed. Therefore, with the laser welding performed by the laser welding apparatus 1, the displacement amount of the second contact surface 22 reaches the target displacement amount Td without applying excessive force to the first resin member 11 and the second resin member 21. When performing laser welding with the laser welding apparatus 1, a longer time is required from when the resin member starts softening until when the joining of the resin members is completed compared to the conventional laser welding performed under a constant clamping force. However, the laser welding performed by the laser welding apparatus 1 reduces the displacement amount of the second contact surface 22 while the second resin member 21 is thermally expanding. Accordingly, the displacement amount of the second contact surface 22 is limited from when the displacement direction of the second contact surface 22 is reversed until when the displacement amount of the second contact surface 22 reaches the target displacement amount Td. This allows the first resin member 11 and the second resin member 21 to be joined during the same processing time as the conventional laser welding performed under a constant clamping force.

Further, for example, as shown in FIG. 4, the laser welding performed by the laser welding apparatus 1 can shorten the processing time from that of the conventional laser welding performed under a constant clamping force. This is because the laser welding performed by the laser welding apparatus 1 limits the displacement amount of the second contact surface 22 while the second resin member 21 is thermally expanding. Accordingly, the displacement amount of the second contact surface 22 is limited from when the displacement direction of the second contact surface 22 is reversed to when the displacement amount of the second contact surface 22 reaches the target displacement amount Td. This shortens the period from when the displacement direction of the second contact surface 22 is reversed to when the displacement amount of the second contact surface 22 reaches the target displacement amount Td. As a result, the laser welding performed by the laser welding apparatus 1 shortens the processing time and reduces the manufacturing cost related with the laser welding of the first resin member 11 and the second resin member 21.

Moreover, for example, as shown in FIG. 5, the laser welding performed by the laser welding apparatus 1 limits excessive pressing of the resin members compared to the conventional laser welding performed under a constant clamping force. With the conventional laser welding performed under a constant clamping force, the resin members may be excessively pressed from when the resin member starts softening until when the joining of the resin members is completed. In such a case, the displacement amount of the contact surface of the resin members will be greater than the target displacement amount Td. Accordingly, burrs may be formed excessively and cracks may be formed in the resin member by increased residual stress. In contrast, the laser welding performed by the laser welding apparatus 1 increases or decreases the clamping force applied to the first resin member 11 and the second resin member 21 in accordance with the state of the first resin member 11 and the second resin member 21 during laser welding. Therefore, the first resin member 11 and the second resin member 21 are not excessively pressed. As a result, the displacement amount of the second contact surface 22 easily reaches the target displacement amount Td.

The present embodiment has the following effects and advantages.

(1) The first resin member 11 is formed of a laser beam-transmissive resin that transmits the laser beam Lw and includes the first contact surface 12. The second resin member 21 is formed of a laser beam-absorbing resin that absorbs the laser beam Lw and includes the second contact surface 22. The laser welding apparatus 1 melts and joins the first contact surface 12 and the second contact surface 22 with a laser beam in a state in which the first resin member 11 and the second resin member 21 are arranged one upon the other with the first contact surface 12 contacting the second contact surface 22. The laser welding apparatus 1 includes the clamping unit 31 that abuts at least one of the first resin member 11 or the second resin member 21, which are arranged one upon the other, to apply clamping force to the at least one of the first resin member 11 or the second resin member 21. The laser welding apparatus 1 includes the laser emitter 32 that emits the laser beam Lw, which is transmitted through the first resin member 11. The laser welding apparatus 1 includes the laser controller 33 that controls the laser output of the laser beam Lw emitted from the laser emitter 32. The laser welding apparatus 1 includes the displacement sensor 34 that measures displacement of at least one of the first contact surface 12 or the second contact surface 22 in the stacking direction X1 of the first resin member 11 and the second resin member 21. The laser welding apparatus 1 includes the control unit 35 that continuously or intermittently obtains the displacement amount of the contact surface from the displacement sensor 34 and controls the clamping unit 31 to increase or decrease the clamping force in accordance with the obtained displacement amount of the contact surface.

In the present embodiment, the clamping unit 31 contacts the second resin member 21 and applies clamping force to the second resin member 21. Further, in the present embodiment, the displacement sensor 34 measures displacement of the second contact surface 22 in the stacking direction X1.

With this configuration, the clamping force applied to the first resin member 11 and the second resin member 21 is increased or decreased in accordance with the displacement amount of the second contact surface 22 in the stacking direction X1. The second contact surface 22 is displaced in the stacking direction X1 in correspondence with the state of the first resin member 11 and the state of the second resin member 21 during laser welding. In other words, the displacement of the second contact surface 22 in the stacking direction X1 is changed in correspondence with the state of the first resin member 11 and the second resin member 21 during laser welding. The clamping force applied to the first resin member 11 and the second resin member 21 is increased or decreased in accordance with the displacement amount of the second contact surface 22. Thus, an appropriate clamping force can be applied to the first resin member 11 and the second resin member 21 in accordance with the state of the first resin member 11 and the second resin member 21 during laser welding. As a result, the formation of burrs and cracks is limited in the first resin member 11 and the second resin member 21. This also limits carbonizing or inadequate melting of the second resin member 21 that would be caused by insufficient pressing of the first resin member 11 and the second resin member 21 against each other.

In the present embodiment, the clamping force applied to the first resin member 11 and the second resin member 21 during laser welding does not become excessive. This limits the formation of burrs and cracks in the welded first resin member 11 and second resin member 21 that would be caused by the residual stress. Further, in the present embodiment, the clamping force applied to the first resin member 11 and the second resin member 21 during laser welding does not become insufficient. This avoids insufficient pressing of the first resin member 11 and the second resin member 21 against each other. Therefore, the laser welding can be performed while restricting the formation of fine gaps between the first contact surface 12 and the second contact surface 22 and facilitating the transfer of heat from the second resin member 21 to the first resin member 11. As a result, carbonizing of the second resin member 21 and inadequate melting of the first resin member 11 are avoided.

(2) When a change in the displacement of the second contact surface 22 resulting from thermal expansion of the second resin member 21 is detected based on the displacement amount of the second contact surface 22 obtained from the displacement sensor 34, the control unit 35 controls the clamping unit 31 to increase the clamping force over a predetermined period. Subsequently, when reversal of the displacement direction of the second contact surface 22 is detected based on the displacement amount of the second contact surface 22 obtained from the displacement sensor 34, the control unit 35 controls the clamping unit 31 to decrease the clamping force in a stepped manner.

With this configuration, the clamping force applied to the first resin member 11 and the second resin member 21 is increased over a predetermined period from when a change in the displacement of the second contact surface 22 resulting from thermal expansion of the second resin member 21 is detected. This restricts separation of the second resin member 21 from the setting surface 45 caused by the thermal expansion of the second resin member 21. This also restricts separation of the first resin member 11 from the second contact surface 22 caused by the thermal expansion of the second resin member 21. In this manner, the first contact surface 12 and the second contact surface 22 remain sufficiently pressed against each other even while the second resin member 21 is thermally expanded.

Further, when reversal of the displacement direction of the second contact surface 22 is detected, the clamping force applied to the first resin member 11 and the second resin member 21 is decreased in a stepped manner. The displacement direction of the second contact surface 22 measured by the displacement sensor 34 is reversed when the second resin member 21 starts softening. Thus, the clamping force applied to the first resin member 11 and the second resin member 21 is decreased in a stepped manner as the second resin member 21 starts to soften. This decreases the amount of softened resin pushed out from the periphery of the first contact surface 12 and the second contact surface 22 and reduces burrs.

(3) When the displacement direction measured by the displacement sensor 34 is reversed, the laser controller 33 controls the laser emitter 32 to increase the laser output in a stepped manner over a preset period.

With this configuration, the output of the laser beam Lw emitted to the second contact surface 22 can be increased in a stepped manner from when the second resin member 21 starts softening. This allows the laser beam Lw to be emitted in accordance with the state of the second resin member 21.

(4) When the preset period elapses, the laser controller 33 controls the laser emitter 32 to gradually decrease the laser output.

With this configuration, the laser output is gradually decreased to gradually cool the first contact surface 12 and the second contact surface 22 that are in a state melted and joined with each other. Also, the first contact surface 12 and the second contact surface 22 are gradually cooled when the clamping force applied to the first resin member 11 and the second resin member 21 is being decreased in a stepped manner. This reduces the residual stress that occurs in the first resin member 11 and the second resin member 21 subsequent to cooling. As a result, the formation of cracks is further limited in the first resin member 11 and the second resin member 21.

(5) The displacement sensor 34 is a contact type displacement sensor.

With this configuration, the contact type displacement sensor 34 directly measures displacement of the setting surface 45. Accordingly, the measurement result of the displacement sensor 34 is subtly affected by microscopic scratches on the setting surface 45 or microscopic matter on the setting surface 45. Therefore, the contact type displacement sensor can detect displacement of the setting surface 45 (second contact surface 22 in present embodiment) more accurately than, for example, an optical displacement sensor. In addition, the contact type displacement sensor can detect displacement of the setting surface 45 at a relatively lower cost than an optical displacement sensor that has the same measurement accuracy.

(6) In a state in which the first resin member 11 and the second resin member 21 are arranged one upon the other so that the first contact surface 12 contacts the second contact surface 22, the laser processing device 2 is used to laser-weld and join the first contact surface 12 and the second contact surface 22 with the laser beam Lw. The laser processing device 2 includes the laser emitter 32 that emits the laser beam Lw, which is transmitted through the first resin member 11. The laser processing device 2 includes the laser controller 33 that controls the laser output of the laser beam Lw emitted from the laser emitter 32. The laser processing device 2 includes the input unit 51 that receives the measurement signal S1 corresponding to the displacement amount of the second contact surface 22 measured by the displacement sensor 34, which measures displacement of the second contact surface 22 in the stacking direction X1 of the first resin member 11 and the second resin member 21. The laser controller 33 controls the laser emitter 32 to change the laser output in a stepped manner based on the measurement signal S1 provided to the input unit 51.

With this configuration, the laser output of the laser beam Lw emitted to the second contact surface 22 is changed in a stepped manner in accordance with the displacement amount of the second contact surface 22 displaced in the stacking direction X1 of the first resin member 11 and the second resin member 21. The second contact surface 22 is displaced in the stacking direction X1 in correspondence with the state of the first resin member 11 and the state of the second resin member 21 during laser welding. In other words, the displacement of the second contact surface 22 in the stacking direction X1 is changed in correspondence with the state of the first resin member 11 and the second resin member 21 during laser welding. The laser output of the laser beam Lw emitted to the second contact surface 22 is changed in a stepped manner in accordance with the displacement amount of the second contact surface 22. Thus, the first resin member 11 and the second resin member 21 are irradiated with the laser beam Lw that is suitable for the state of the first resin member 11 and the second resin member 21 during laser welding. This limits the formation of excessive burrs and the occurrence of cracking in the first resin member 11 and the second resin member 21.

(7) Subsequent to a change in the displacement of the second contact surface 22 resulting from thermal expansion of the second resin member 21 that is detected based on the measurement signal S1 provided to the input unit 51, when reversal of displacement direction of the second contact surface 22 is detected based on the measurement signal S1, the laser controller 33 controls the laser emitter 32 to increase the laser output in a stepped manner over a preset period.

With this configuration, the output of the laser beam Lw emitted to the second contact surface 22 can be increased in a stepped manner from when the second resin member 21 starts softening. This allows the laser beam Lw to be emitted in accordance with the state of the second resin member 21. As a result, the first resin member 11 and second resin member 21 are joined with improved quality.

The present embodiment may be modified as follows. The present embodiment and the following modifications can be combined as long as the combined modifications remain technically consistent with each other.

In the above embodiment, the laser controller 33 controls the laser emitter 32 to increase the laser output in a stepped manner over the preset period from when reversal of the displacement direction of the second contact surface 22 is detected (that is, during period t12 and period t13 in above embodiment). Subsequently, the laser controller 33 gradually decreases the laser output when the preset period elapses. Instead, the laser controller 33 may, for example, decrease the laser output in a stepped manner when the predetermined period elapses. Alternatively, the laser controller 33 may, for example, control the laser emitter 32 to stop emission of the laser beam Lw when the predetermined period elapses.

The cooling of the first resin member 11 and the second resin member 21 may be started at a time point differing from that in the above embodiment.

For example, the laser controller 33 may be configured to control the laser emitter 32 to gradually decrease the laser output when detecting from the clamp control signal S2 provided to the input unit 51 that the clamping force is being decreased in a stepped manner and from the measurement signal S1 provided to the input unit 51 that a change amount of the displacement of the second contact surface 22 has been the same over a predetermined period.

By gradually decreasing the laser output in this manner, the first contact surface 12 and the second contact surface 22, which are in a state molten and joined with each other, are gradually cooled. Also, the first contact surface 12 and the second contact surface 22 are gradually cooled as the clamping force applied to the first resin member 11 and the second resin member 21 decreases in a stepped manner. This reduces residual stress that occurs in the first resin member 11 and the second resin member 21 subsequent to cooling. As a result, the formation of cracks is further limited in the first resin member 11 and the second resin member 21.

In a state in which, for example, the first contact surface 12 and the second contact surface 22 are both molten, when the clamping force applied by the clamping unit 31 to the first resin member 11 and the second resin member 21 is constant, there will be a period during which the change amount of the displacement of the second contact surface 22 becomes constant. Therefore, the cooling of the first resin member 11 and the second resin member 21 can be started at a time point suitable for the state of the first resin member 11 and the second resin member 21 during laser welding by gradually decreasing the laser output when detecting that the change amount of the displacement of the second contact surface 22 has been constant over a predetermined period. The change amount of the displacement of the second contact surface 22 being constant over the predetermined period can be detected, for example, when the change amount of the displacement measured by the displacement sensor 34 has been a value included in a range between preset threshold values over the predetermined period.

Alternatively, for example, the laser controller 33 may control the laser emitter 32 to gradually decrease the laser output or stop emission of the laser beam Lw when detecting that the displacement amount of the second contact surface 22 is equal to a preset displacement amount from the measurement signal S1 provided to the input unit 51.

In the above embodiment, the laser controller 33 controls the laser emitter 32 to increase the laser output in a stepped manner over a preset period after a change in the displacement of the second contact surface 22 resulting thermal expansion of the second resin member 21 is detected based on the measurement signal S1 and when reversal of displacement direction of the second contact surface 22 is detected based on the measurement signal S1. Alternatively, the laser output may be increased in a stepped manner at a time point differing from that in the above embodiment after a change in the displacement of the second contact surface 22 resulting from thermal expansion of the second resin member 21 is detected based on the measurement signal S1.

The laser controller 33 may be configured to control the laser emitter 32 to increase the laser output in a stepped manner over a preset period, for example, from when a change in the displacement of the second contact surface 22 resulting from thermal expansion of the second resin member 21 is detected based on the measurement signal S1 provided to the input unit 51. In this manner, the laser output of the laser beam Lw emitted to the second contact surface 22 can be increased in a stepped manner from when the second resin member 21 starts thermal expansion. This allows the laser beam Lw to be emitted in accordance with the state of the second resin member 21. As a result, the first resin member 11 and second resin member 21 are joined with improved quality.

Alternatively, the laser controller 33 may be configured to control the laser emitter 32 to increase the laser output in a stepped manner over a preset period, for example, from when an increase in the clamping force is detected based on the clamp control signal S2 provided to the input unit 51. In this manner, the laser output of the laser beam Lw emitted to the second contact surface 22 can be increased in a stepped manner from when the second resin member 21 starts thermal expansion in a case where the clamping force is increased in accordance with the change in the displacement of the second contact surface 22 resulting from the thermal expansion of the second resin member 21. This allows the laser beam Lw to be emitted in accordance with the state of the second resin member 21. As a result, the first resin member 11 and second resin member 21 are joined with improved quality.

In the above embodiment, the laser output is increased in a stepped manner by one step whenever a predetermined period elapses. Instead, the laser controller 33 may control the laser emitter 32 to increase the laser output in a stepped manner based on the measurement signal S1. For example, the laser controller 33 may control the laser emitter 32 to increase the laser output by one step whenever displacement (that is, position of contact surface in stacking direction X1) measured by the displacement sensor 34 based on the measurement signal S1 becomes equal to a preset displacement. Alternatively, the laser controller 33 may control the laser emitter 32 to increase the laser output by one step, for example, whenever detecting that the displacement amount of the second contact surface 22 in the positive direction based on the measurement signal S1 becomes equal to a preset displacement amount.

Figure 6:
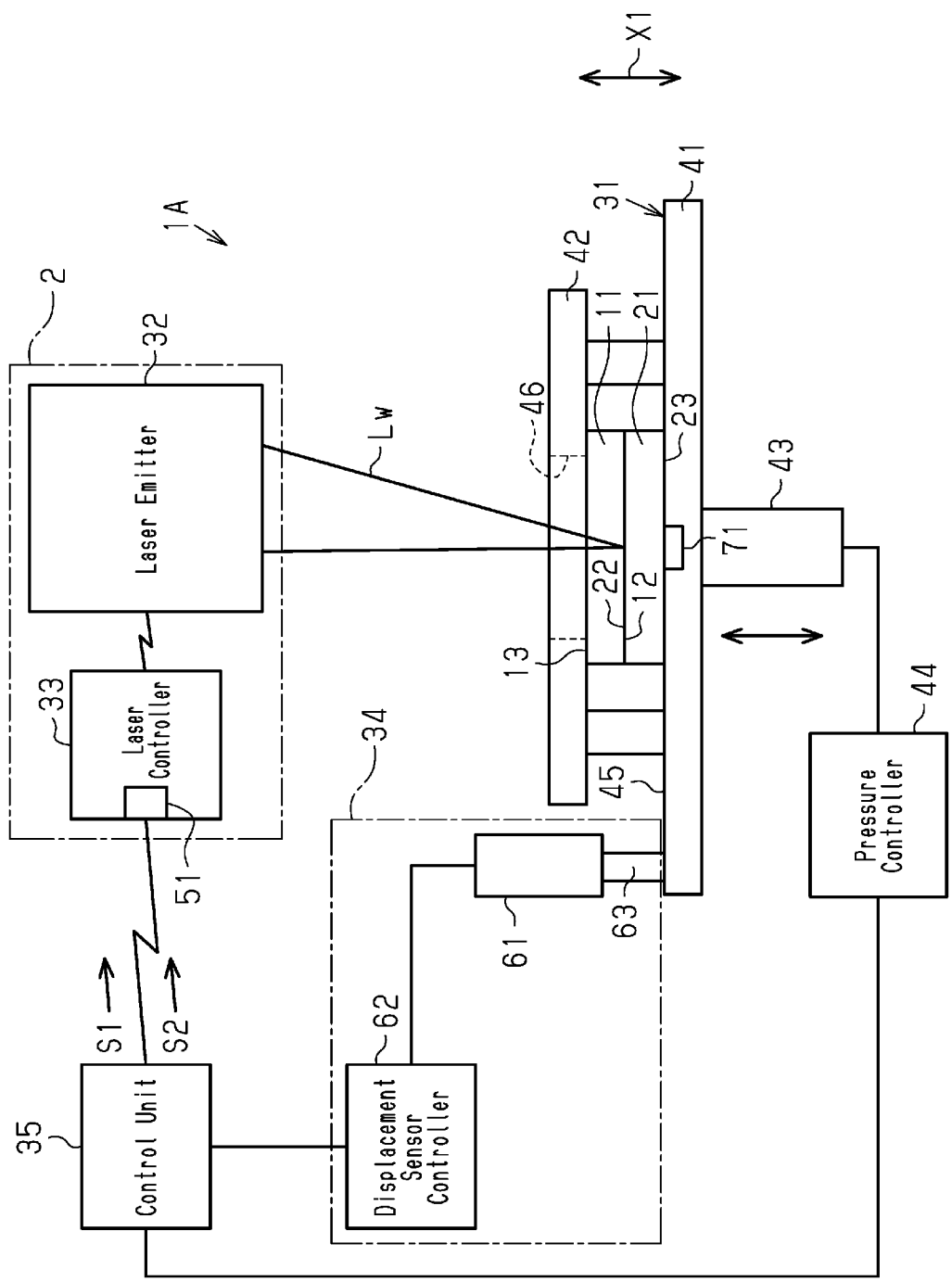
FIG. 6 is a schematic diagram of a laser welding apparatus in accordance with a modified example.

As shown in FIG. 6, the laser welding apparatus 1 may further include a reactive force measuring sensor 71 that measures the reactive force added to the clamping unit 31 by at least one of the first resin member 11 or the second resin member 21 that is in contact with the clamping unit 31. The control unit 35 may obtain the reactive force measured by the reactive force measuring sensor 71 and control the clamping unit 31 to increase or decrease the clamping force in accordance with the displacement amount of the second contact surface 22 obtained from the displacement sensor 34 and the reactive force obtained from the reactive force measuring sensor 71.

As shown in FIG. 6, in a laser welding apparatus 1A, the reactive force measuring sensor 71 is arranged on the movable stage 41 and exposed from the setting surface 45. In FIG. 6, same reference numerals are given to those components that are the same as the corresponding components of the above embodiment. The reactive force measuring sensor 71 contacts the second abutment surface 23 of the second resin member 21 arranged on the setting surface 45 and measures the reactive force added to the movable stage 41 by the second resin member 21. An example of the reactive force measuring sensor 71 is a load cell.

The control unit 35 obtains the reactive force measured by the reactive force measuring sensor 71. For example, the control unit 35 obtains the reactive force measured by the reactive force measuring sensor 71 continuously or intermittently.

When performing laser welding on the first resin member 11 and the second resin member 21, the reactive force measured by the reactive force measuring sensor 71 is increased in correspondence with thermal expansion of the second resin member 21 at the stage in which the second resin member 21 is thermally expanded. Further, when the second resin member 21 starts softening, the reactive force measured by the reactive force measuring sensor 71 is decreased.

The control unit 35 controls the clamping unit 31 to increase the clamping force over a predetermined period, for example, when detecting that the reactive force obtained from the reactive force measuring sensor 71 is greater than a preset threshold value and that the second contact surface 22 is displaced by thermal expansion of the second resin member 21 based on the change in the displacement amount obtained from the displacement sensor 34.

Subsequently, the control unit 35 controls the clamping unit 31 to decrease the clamping force in a stepped manner, for example, when detecting that the displacement direction of the second contact surface 22 is reversed based on the displacement amount obtained from the displacement sensor 34 and that the reactive force obtained from the reactive force measuring sensor 71 is less than the preset threshold value.

In this manner, the clamping force applied to the first resin member 11 and the second resin member 21 is increased or decreased in accordance with the reactive force, which is added to the clamping unit 31 by the second resin member 21, in addition to the displacement amount of the second contact surface 22. The reactive force added to the clamping unit 31 by the second resin member 21, which is in contact with the clamping unit 31, changes in accordance with the state of the first resin member 11 and the second resin member 21 during laser welding. Therefore, clamping force can be applied in a further suitable manner to the first resin member 11 and the second resin member 21 during laser welding in accordance with the state of the first resin member 11 and the second resin member 21 by further increasing or decreasing the clamping force applied to the first resin member 11 and the second resin member 21 in accordance with the reactive force. As a result, the formation of burrs and cracks is further limited in the first resin member 11 and the second resin member 21.

The reactive force measuring sensor 71 may be arranged on the top panel 42 to contact the first abutment surface 13.

In the above embodiment, the measurement signal S1 corresponding to the displacement amount measured by the displacement sensor 34 is provided to the input unit 51. However, the measurement signal S1 does not have to be provided to the input unit 51. In this case, the control unit 35 may provide the input unit 51 with, for example, a first detection signal indicating that a change in the displacement of the second contact surface 22 resulting from thermal expansion of the second resin member 21 has been detected based on the displacement amount obtained from the displacement sensor 34. Further, the control unit 35 may provide the input unit 51 with a second detection signal indicating that reversal of the displacement direction of the second contact surface 22 has been detected based on the displacement amount obtained from the displacement sensor 34 when the reversal of the displacement direction of the second contact surface 22 is detected. In this case, the laser controller 33 controls the laser emitter 32 to increase the laser output in a stepped manner over a preset period, for example, after detecting that the first detection signal is provided to the input unit 51 and when detecting that the second detection signal is provided to the input unit 51.

In the above embodiment, the displacement sensor 34 measures displacement of the setting surface 45 to measure displacement of the second contact surface 22. Instead, the displacement sensor 34 may measure displacement of the setting surface 45 to measure displacement of the first contact surface 12. Alternatively, instead of the setting surface 45, the displacement sensor 34 may measure displacement of a surface that is displaced in the same manner as at least one of the first contact surface 12 or the second contact surface 22. For example, the displacement sensor 34 may measure displacement of the surface of the movable stage 41 located at the side opposite to the setting surface 45 to measure displacement of at least one of the first contact surface 12 or the second contact surface 22. Further, for example, when the displacement sensor 34 is an optical displacement sensor, the displacement sensor 34 may measure displacement of at least one of the first contact surface 12 or the second contact surface 22.

In the above embodiment, the clamping force applied to the first resin member 11 and the second resin member 21 is decreased in a stepped manner by one step whenever a predetermined period elapses. Instead, the control unit 35 may control the clamping unit 31 to decrease the clamping force applied to the first resin member 11 and the second resin member 21 in a stepped manner in accordance with the displacement amount measured by the displacement sensor 34. For example, the clamping force applied to the first resin member 11 and the second resin member 21 may be decreased by one step whenever displacement (that is, position of contact surface in stacking direction X1) measured by the displacement sensor 34 becomes equal to a preset displacement. Alternatively, the clamping force applied to the first resin member 11 and the second resin member 21 may be decreased by one step, for example, whenever a displacement amount in the positive direction becomes equal to a preset displacement amount.

The clamping unit 31 may contact and apply clamping force to the first resin member 11 in the stacking direction X1. Alternatively, the clamping unit 31 may contact and apply a clamping force to both of the first resin member 11 and the second resin member 21 in the stacking direction X1. In the clamping unit 31 of the above embodiment, for example, the movable stage 41 may be replaced by a fixed stage that is not moved in the stacking direction X1 during laser welding, and the top panel 42 may be a movable panel. In this case, the pressure adjustment unit 43 applies pressure to the top panel 42, which is a movable panel, in the stacking direction X1 in order to apply clamping force to the first resin member 11 and ensure that the first contact surface 12 and the second contact surface 22 are pressed against each other. In this case, the displacement sensor 34 is configured to measure displacement of, for example, the surface of the top panel 42 that is in contact with the first abutment surface 13. Instead of the surface of the top panel 42 contacting the first abutment surface 13, the displacement sensor 34 may measure displacement of a surface that is displaced in the same manner as at least one of the first contact surface 12 or the second contact surface 22.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A laser welding apparatus that joins a first resin member, which is formed of a laser beam-transmissive resin and includes a first contact surface, and a second resin member, which is formed of a laser beam-absorbing resin and includes a second contact surface, by melting the first contact surface and the second contact surface with a laser beam in a state in which the first resin member and the second resin member are arranged one upon another with the first contact surface contacting the second contact surface, the laser welding apparatus comprising:

a clamping unit that abuts at least one of the first resin member or the second resin member, which are arranged one upon the other, to apply clamping force to the at least one of the first resin member or the second resin member;

a laser emitter that emits the laser beam transmitted through the first resin member;

a laser controller that controls a laser output of the laser beam emitted from the laser emitter;

a displacement sensor that measures displacement of at least one of the first contact surface or the second contact surface in a direction in which the first resin member and the second resin member are arranged one upon the other; and a control unit that continuously or intermittently obtains a displacement amount of the at least one of the first contact surface or the second contact surface from the displacement sensor and controls the clamping unit to increase or decrease the clamping force in accordance with the obtained displacement amount of the at least one of the first contact surface or the second contact surface, wherein:

when the control unit detects a change in the displacement of the at least one of the first contact surface or the second contact surface resulting from thermal expansion of the second resin member based on the displacement amount of the at least one of the first contact surface and the second contact surface obtained from the displacement sensor, the control unit controls the clamping unit to increase the clamping force, and when the control unit subsequently detects reversal of a direction of the displacement of the at least one of the first contact surface or the second contact surface based on the displacement amount of the at least one of the first contact surface or the second contact surface obtained from the displacement sensor, the control unit controls the clamping unit to decrease the clamping force.

2. The laser welding apparatus according to claim 1, wherein:

when the control unit detects the change in the displacement of the at least one of the first contact surface or the second contact surface resulting from the thermal expansion of the second resin member based on the displacement amount of the at least of the first contact surface and the second contact surface obtained from the displacement sensor, the control unit controls the clamping unit to increase the clamping force over a predetermined period, and when the control unit subsequently detects the reversal of the direction of the displacement of the at least one of the first contact surface or the second contact surface based on the displacement amount of the at least one of the first contact surface or the second contact surface obtained from the displacement sensor, the control unit controls the clamping unit to decrease the clamping force in a stepped manner.

3. The laser welding apparatus according to claim 2, wherein when the displacement direction measured by the displacement sensor is reversed, the laser controller controls the laser emitter to increase the laser output in a stepped manner over a preset period.

4. The laser welding apparatus according to claim 3, wherein when the preset period elapses, the laser controller controls the laser emitter to gradually decrease the laser output.

5. The laser welding apparatus according to claim 1, wherein the displacement sensor is a contact displacement sensor.

6. The laser welding apparatus according to claim 1, further comprising:

a reactive force measuring sensor that measures a reactive force added to the clamping unit by the at least one of the first resin member or the second resin member, which the clamping unit abuts against, wherein the control unit obtains the reactive force measured by the reactive force measuring sensor and controls the clamping unit to increase or decrease the clamping force in accordance with the displacement amount of the at least one of the first contact surface or the second contact surface obtained from the displacement sensor and the reactive force obtained from the reactive force measuring sensor.

7. A laser processing device used to laser-weld and join a first resin member, which is formed of a laser beam-transmissive resin and includes a first contact surface, and a second resin member, which is formed of a laser beam-absorbing resin and includes a second contact surface, by melting the first contact surface and the second contact surface with a laser beam in a state in which the first resin member and the second resin member are arranged one upon another with the first contact surface contacting the second contact surface, the laser processing device comprising:

a laser emitter that emits the laser beam transmitted through the first resin member;

a laser controller that controls a laser output of the laser beam emitted from the laser emitter; and an input unit that receives a measurement signal corresponding to a displacement amount of at least one of the first contact surface or the second contact surface measured by a displacement sensor that measures displacement of the at least one of the first contact surface or the second contact surface in a direction in which the first resin member and the second resin member are arranged one upon the other, wherein the laser controller controls the laser emitter to change the laser output in a stepped manner based on the measurement signal provided to the input unit, and wherein after the laser controller detects a change in the displacement of the at least one of the first contact surface or the second contact surface resulting from thermal expansion of the second resin member from the measurement signal provided to the input unit, when the laser controller detects reversal of a direction of the displacement of the at least one of the first contact surface or the second surface from the measurement signal, the laser controller controls the laser emitter to increase the laser output.

8. The laser processing device according to claim 7, wherein after the laser controller detects the change in the displacement of the at least one of the first contact surface or the second contact surface resulting from the thermal expansion of the second resin member from the measurement signal provided to the input unit, when the laser controller detects the reversal of the direction of the displacement of the at least one of the first contact surface or the second surface from the measurement signal, the laser controller controls the laser emitter to increase the laser output in a stepped manner over a preset period.

9. The laser processing device according to claim 7, wherein:

the input unit is further provided with a clamp control signal corresponding to a clamping force applied by a clamping unit to at least one of the first resin member or the second resin member, which are arranged one upon the other, the clamping unit being abut against the one of the first resin member and the second resin member; and the laser controller controls the laser emitter to increase the laser output in a stepped manner over a preset period from either one of when a change in the displacement of the at least one of the first contact surface or the second contact surface resulting from thermal expansion of the second resin member is detected based on the measurement signal provided to the input unit and when an increase in the clamping force is detected based on the clamp control signal provided to the input unit.

10. The laser processing device according to claim 8, wherein when the preset period elapses, the laser controller controls the laser emitter to gradually decrease the laser output.

11. The laser processing device according to claim 7, wherein:

the input unit is further provided with a clamp control signal corresponding to a clamping force applied by a clamping unit to at least one of the first resin member or the second resin member, which are arranged one upon the other, the clamping unit being abut against the one of the first resin member and the second resin member; and the laser controller controls the laser emitter to gradually decrease the laser output when detecting that the clamping force is being decreased in a stepped manner from the clamp control signal provided to the input unit and that a change amount of the displacement of the at least one of the first contact surface or the second contact surface is constant over a predetermined period based on the measurement signal provided to the input unit.

\* \* \* \* \*